(12) United States Patent
Aucoin et al.

(10) Patent No.: US 10,386,202 B2
(45) Date of Patent: Aug. 20, 2019

(54) SYSTEMS AND METHODS FOR DETERMINING QUALITY AND INTEGRITY OF SOURCE INFORMATION TO DETERMINE NAVIGATION INFORMATION OF AN OBJECT

(71) Applicant: The Charles Stark Draper Laboratory, Inc., Cambridge, MA (US)

(72) Inventors: Michael Aucoin, North Andover, MA (US); Juha-Pekka J. Laine, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 18 days.

(21) Appl. No.: 15/435,412

(22) Filed: Feb. 17, 2017

(65) Prior Publication Data

US 2018/0238709 A1 Aug. 23, 2018

(51) Int. Cl.
*G01C 21/00* (2006.01)
*G01C 21/20* (2006.01)
(Continued)

(52) U.S. Cl.
CPC ............ *G01C 25/00* (2013.01); *G01C 21/005* (2013.01); *G01C 21/20* (2013.01); *G01C 21/28* (2013.01); *G01C 23/00* (2013.01); *G01S 19/20* (2013.01)

(58) Field of Classification Search
CPC ......... G01S 19/20; G01C 21/20; G01C 23/00; G01C 25/00; G01C 21/005
See application file for complete search history.

(56) References Cited

U.S. PATENT DOCUMENTS 5,923,286 A * 7/1999 Divakaruni .......... G01C 21/165
342/357.44
2013/0338958 A1 12/2013 Shanishchara et al.
(Continued)

FOREIGN PATENT DOCUMENTS

EP 2 930 534 A1 10/2015
EP 3 073 224 A1 9/2016
WO WO 2018/151844 A1 8/2018

OTHER PUBLICATIONS

International Searching Authority Authorized Officer Pascheka, Patrick, Notification on Transmittal of the International Search Report and the Written Opinion of the International Searching Authority, or the Declaration, PCT/US2018/000059. 18 pages, dated Jun. 6, 2018.

*Primary Examiner* — Bryan Bui
(74) *Attorney, Agent, or Firm* — Sunstein Kann Murphy & Timbers LLP (57) ABSTRACT

A navigation system for determining quality and integrity of source information includes one or more data sources that provide the source information, a situation module that provides situation data, an information module that determines an estimate of the quality and an estimate of the integrity of the source information based on the source information and the situation data, an integrity monitor module that determines the integrity and the quality of the source information based on the estimate of the quality and the estimate of the integrity of the source information from the information module, and that validates the source information based on the integrity of the source information and/or the quality of the source information, and a navigation state estimator that determines the navigation information of the one or more objects based on the validated source information and corresponding quality of the source information received from the integrity monitor module.

28 Claims, 4 Drawing Sheets

(51) Int. Cl.
*G01C 21/28* (2006.01)
*G01C 23/00* (2006.01)
*G01C 25/00* (2006.01)
*G01S 19/20* (2010.01)

(56) References Cited

U.S. PATENT DOCUMENTS

| | | | |
|---|---|---|---|
| 2014/0019038 A1* | 1/2014 | Shehi | G01C 23/00 |
| | | | 701/416 |
| 2014/0025286 A1 | 1/2014 | Donovan et al. | |
| 2014/0062781 A1 | 3/2014 | Mathews et al. | |
| 2017/0322313 A1* | 11/2017 | Revol | G01S 19/08 |

* cited by examiner

SYSTEMS AND METHODS FOR DETERMINING QUALITY AND INTEGRITY OF SOURCE INFORMATION TO DETERMINE NAVIGATION INFORMATION OF AN OBJECT

TECHNICAL FIELD

The present invention relates to determining the navigation information for one or more objects in environments when source information from at least one data source may be compromised, and more particularly, for determining which data sources should be relied on to determine navigation information.

BACKGROUND ART

Objects, such as airplane and motor vehicles, may be provided with information from data sources that are used to determine the objects' navigation information. However, the objects do not verify that the information from the data sources is reliable. Consequently, if the data source information is inaccurate, the resulting navigation information may be inaccurate, as well. Because the objects require accurate navigation information to navigate to the desired destination, the inability to obtain such reliable information may jeopardize the success of their endeavors.

SUMMARY OF THE EMBODIMENTS

In accordance with one embodiment of the invention, a navigation system determines quality and integrity of source information to determine navigation information of one or more objects. The system includes one or more data sources. Each data source is configured to provide the source information. The system also includes a situation module configured to provide situation data. The system also includes an information module configured to determine an estimate of the quality and an estimate of the integrity of the source information, at a given time, based on the source information received from the one or more data sources and based on the situation data received from the situation module.

The system also includes an integrity monitor module configured to receive the estimate of the quality and the estimate of the integrity of the source information from the information module and to receive the source information from the one or more data sources, configured to determine the integrity and the quality of the source information based on the estimate of the quality and the estimate of the integrity of the source information from the information module, and configured to validate the source information based on the integrity of the source information and/or the quality of the source information. The system also includes a navigation state estimator configured to determine the navigation information of the one or more objects based on the source information that was validated and corresponding quality of the source information received from the integrity monitor module.

The one or more data sources may be further configured to provide the quality of the source information and/or the integrity of the source information. The information module may be further configured to receive the quality of the source information from the one or more data sources and/or the integrity of the source information from the one or more data sources. The information module may be configured to determine the estimate of the quality and the estimate of the integrity of the source information further based on the quality of the source information from the one or more data sources and/or the integrity of the source information from the one or more data sources.

The integrity monitor module may be configured to receive the quality of the source information from the one or more data sources and/or the integrity of the source information from the one or more data sources. The integrity monitor module may be configured to determine the integrity and the quality of the source information further based on the quality of the source information from the one or more data sources and/or the integrity of the source information from the one or more data sources.

In some embodiments, the integrity monitor module is configured to determine whether to use the source information from the one or more data sources or to process at least a portion of the source information and to use the processed source information. The integrity monitor module performs this determination based on the estimate of the quality and the estimate of the integrity of the source information from the information module and the quality of the source information from the one or more data sources and/or the integrity of the source information from the one or more data sources.

The navigation state estimator may be configured to provide the navigation information of the one or more objects to the integrity monitor module. The integrity monitor module may be configured to determine the integrity and the quality of the source information further based on the navigation information.

The integrity monitor module may be further configured to compare the integrity of the source information from the one or more data sources and/or the quality of the source information from the one or more data sources, to the estimate of the integrity from the information module and/or the estimate of the quality from the information module, in order to determine the integrity and the quality of the source information.

In some embodiments, the integrity monitor module is configured to ignore the source information from the one or more data sources when a difference between a value of the source information and an expected value of the source information differs by more than a threshold value. The information module may be further configured to replace the integrity of the source information from the one or more data sources and/or the quality of the source information from the one or more data sources, when determining the estimate of the quality and the estimate of the integrity of the source information.

The integrity monitor module may be further configured to validate the source information when the quality of the source information falls within a predetermined acceptable range. The integrity monitor module may be configured to determine whether to use the source information from the one or more data sources or to process at least a portion of the source information and to use the processed source information, based on the estimate of the quality and the estimate of the integrity of the source information from the information module.

In some embodiments, the navigation state estimator is configured to provide the navigation information of the one or more objects to the integrity monitor module, and the integrity monitor module is configured to determine the integrity and the quality of the source information further based on the navigation information.

The information module may be configured to maintain a dynamic state and a probabilistic state of the source information based on the situation data. The information module may be configured to determine the estimate of the quality and the estimate of the integrity further based on the dynamic state and the probabilistic state of the source information when the situation data establishes that the source information was obtained in a known situation. The information module may be configured to determine the estimate of the quality and the estimate of the integrity further based on the probabilistic state of the source information when the situation data establishes that the source information was obtained in an uncertain situation.

The navigation information may include geolocation, velocity, altitude, errors in position, errors in velocity, errors in attitude, time, clock errors, propagation delays, GPS satellite errors, sensor errors, and/or sensor characterization parameters.

The navigation state estimator may include an extended Kalman filter, a particle filter, a nonlinear moment filter, a Hidden Markov Model, and/or a Bayesian filter.

In some embodiments, the situation module receives the situation data from databases with stored situation data previously known, from communication links with updated situation data that changes over time, from the one or more data sources, and/or from detection systems that provide the situation data based on detected conditions.

The situation data may include environment conditions, position information, temporal information, platform configuration, mission phase, data source location, system health, mission plan, threat data, condition of a threat, threat operating capabilities, threat location, temperature, cloud cover, visibility, barometric pressure, terrain, time of year, tides, radiation environment, population, city information, street information, building information, known transmitters, known vehicles, visible stars, and/or location of satellites in the sky.

In accordance with another embodiment of the invention, a method determines quality and integrity of source information to determine navigation information of one or more objects. The method includes providing the source information from one or more data sources. The method also includes providing situation data from a situation module. The method also includes determining an estimate of the quality and an estimate of the integrity of the source information, at a given time, based on the situation data and the source information. The method also includes determining the integrity and the quality of the source information based on the estimate of the quality and the estimate of the integrity of the source information. The method also includes validating the source information based on the integrity of the source information and/or the quality of the source information. The method also includes determining the navigation information of the one or more objects based on the source information that was validated and corresponding quality of the source information.

In some embodiments, the method also includes providing the quality of the source information and/or the integrity of the source information from the one or more data sources. Determining the estimate of the quality and the estimate of the integrity of the source information may be based on the quality of the source information from the one or more data sources and/or the integrity of the source information from the one or more data sources. Additionally, determining the integrity and the quality of the source information may be based on the quality of the source information from the one or more data sources and/or the integrity of the source information from the one or more data sources.

The method may include determining whether to use the source information from the one or more data sources or to process at least a portion of the source information and to use the processed source information. This determination may be based on the estimate of the quality and the estimate of the integrity of the source information and the quality of the source information from the one or more data sources and/or the integrity of the source information from the one or more data sources.

The method may also include providing the navigation information of the one or more objects, and may include determining the integrity and the quality of the source information further based on the navigation information. The method may also include comparing the integrity of the source information from the one or more data sources and/or the quality of the source information from the one or more data sources, to the estimate of the integrity and/or the estimate of the quality, to determine the integrity and the quality of the source information.

The method may include ignoring the source information from the one or more data sources when a difference between a value of the source information from one or more data sources and an expected value of the source information differs by more than a threshold value. The method may also include replacing the integrity of the source information from the one or more data sources and/or the quality of the source information from the one or more data sources, when determining the estimate of the quality and the estimate of integrity of the source information.

In some embodiments, validating the source information includes validating when the quality of the source information falls within a predetermined acceptable range. The method may also include determining whether to use the source information from the one or more data sources or to process at least a portion of the source information and to use the processed source information, based on the estimate of the quality and the estimate of the integrity of the source information. The method may also include providing the navigation information of the one or more objects, wherein determining the integrity and the quality of the source information is further based on the navigation information.

The method may also include maintaining a dynamic state and a probabilistic state of the source information based on the situation data. Determining the estimate of the quality and the estimate of the integrity of the source information may be based on the dynamic state and the probabilistic state of the source information when the situation data establishes that the source information was obtained in a known situation. The estimates may be based on the probabilistic state of the source information when the situation data establishes that the source information was obtained in an uncertain situation.

Determining the navigation information of the one or more objects may include applying an extended Kalman filter, a particle filter, a nonlinear moment filter, a Hidden Markov Model, and/or a Bayesian filter to the source information that was validated and the corresponding quality of the source information. In some embodiments, the situation module receives the situation data from databases with stored situation data previously known, from communication links with updated situation data that changes over time, from the one or more data sources, and/or from detection systems that provide the situation data based on detected conditions.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Object" refers to an entity that may move, such as a vehicle or person.

"Data source" refers to a source of data that provides information that may be used to determine the navigation information of one or more objects.

"Source information" refers to information provided by a data source.

"Integrity of source information" refers to a measure of source information related to whether the source information is trustworthy and from a data source that is performing as intended, e.g., the data source is not subjected to interference or jamming, and thus the source information is not altered in some way.

"Quality of source information" refers to a measure of source information related to whether a data source is providing the source information according to its specifications without any degradation, or a measure of source information that specifies the accuracy of the source information at a given time.

"Navigation information" may include the geolocation, velocity, altitude, errors in position, errors in velocity, errors in attitude, time, clock errors, propagation delays, GPS satellite errors, sensor errors, and/or sensor characterization parameters, by way of example.

Overview of the System

Embodiments of the present navigation system provide the best possible navigation information resulting from several navigation data sources or sensors in an environment in which one or more of those sources may be challenged, contested, degraded, or denied and, preferably, to do so without human intervention. Data sources in such an environment may provide widely varying navigation information quality and integrity depending on the challenges presented by the environment. In addition, the source information provided by some of the data sources may be challenged or compromised, such that the data sources have good perceived quality but, in fact, lack integrity, e.g., the source information has been compromised or altered in some way. Embodiments of the present navigation system are capable of identifying both the quality and integrity of data sources based on the environment and using this quality and integrity information in the navigation information accordingly. In addition, identification of quality and integrity of data sources is not static but instead may change over time depending on many factors, e.g., mission phase, location, and system health. Embodiments of the present navigation system maintain awareness of the situation in which the data sources are operating and maintain information model(s) describing the dynamic and probabilistic state of the source information when the situation in which the source information is obtained is fully known and a probabilistic state representing the uncertainty associated with the source information when the situation is uncertain.

For example, in both government organizations and commercial enterprises, navigation information is critical for successfully completing particular objectives. For instance, pilots and/or drones conducting missions on behalf of the military or intelligence agencies must know their geolocations to obtain meaningful information. Extraction teams tasked with rescuing civilian and military hostages must track their geolocations and times to ensure that they reach their targeted destination at the designated times. Autonomous robots deployed to search, unearth, and/or defuse land mines in previously war-torn regions risk triggering explosions if they fail to evade known land mines. Commercial pilots conducting transoceanic flights must rely on their instruments for geolocation because their environments may generally lack identifying geographical features (e.g., mountain ranges, distinct coast lines). Energy companies may send autonomous vehicles into remote and/or dangerous environments to repair or maintain equipment.

Although the Global Positioning System (GPS) is the most commonly used navigation system for providing an object with its navigation information, the GPS system is not always available or may be unreliable. For example, in some situations, the object may be proximate to an insufficient number of GPS satellites. In other situations, a particular environment may interfere with the object's ability to communicate with the satellites, despite their number and location (e.g., mountains that deflect or degrade signals). Further, an object may be subject to other types of interference, such as hostile organizations intent on spoofing or jamming GPS signals to prevent the object from obtaining accurate navigation information.

Redundant navigational capabilities decrease an object's vulnerability to erroneously determined navigation information. Other data sources, described in more detail below, may supplement and/or replace GPS signals in determining the navigation information. However, depending on the object's situation, information from one or more of these data sources may be unreliable. Like GPS, these data sources may function improperly and thereby output source information of dubious integrity, and they are also vulnerable to external interference. Thus, additional data sources may not, in and of themselves, guarantee more accurate navigation information. Furthermore, because the reliability of any given data source changes dynamically based on the data source's situation, ensuring that reliable source information is solely used to determine navigation information becomes a more challenging endeavor.

Figure 1:
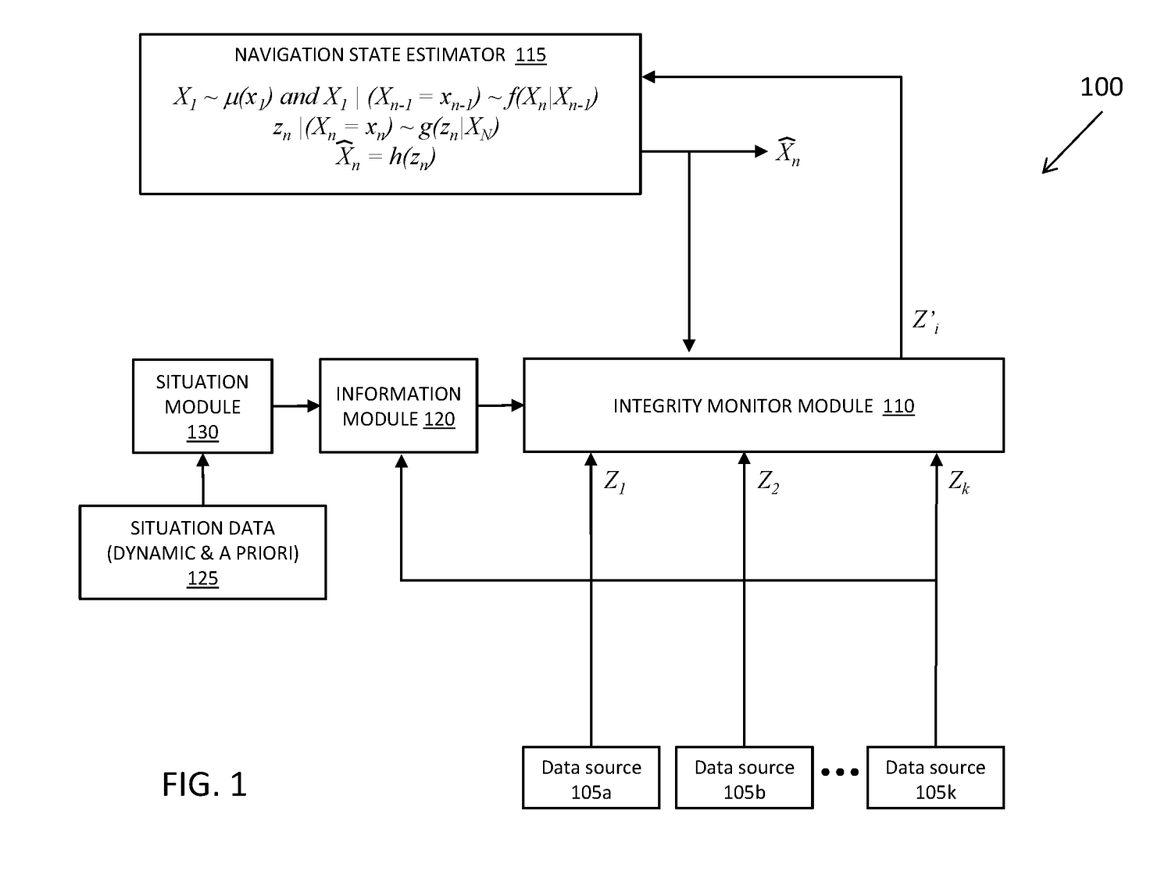
FIG. 1 depicts an exemplary system for determining quality and integrity of source information to determine navigation information of one or more objects.
Figure 2:
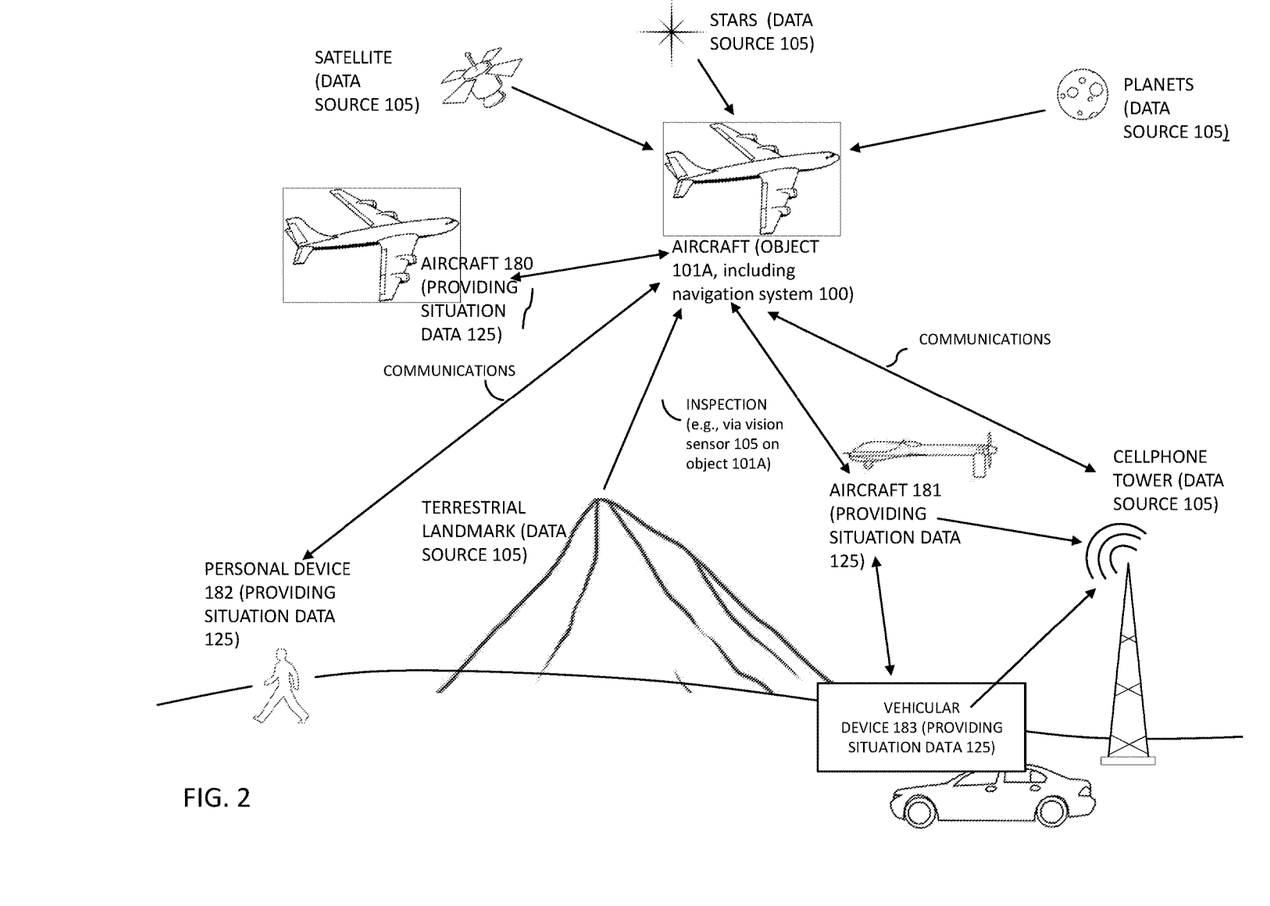
FIGS. 2-4 depict exemplary implementations of the system of FIG. 1 and environments in which the implementations may operate.
Figure 3:
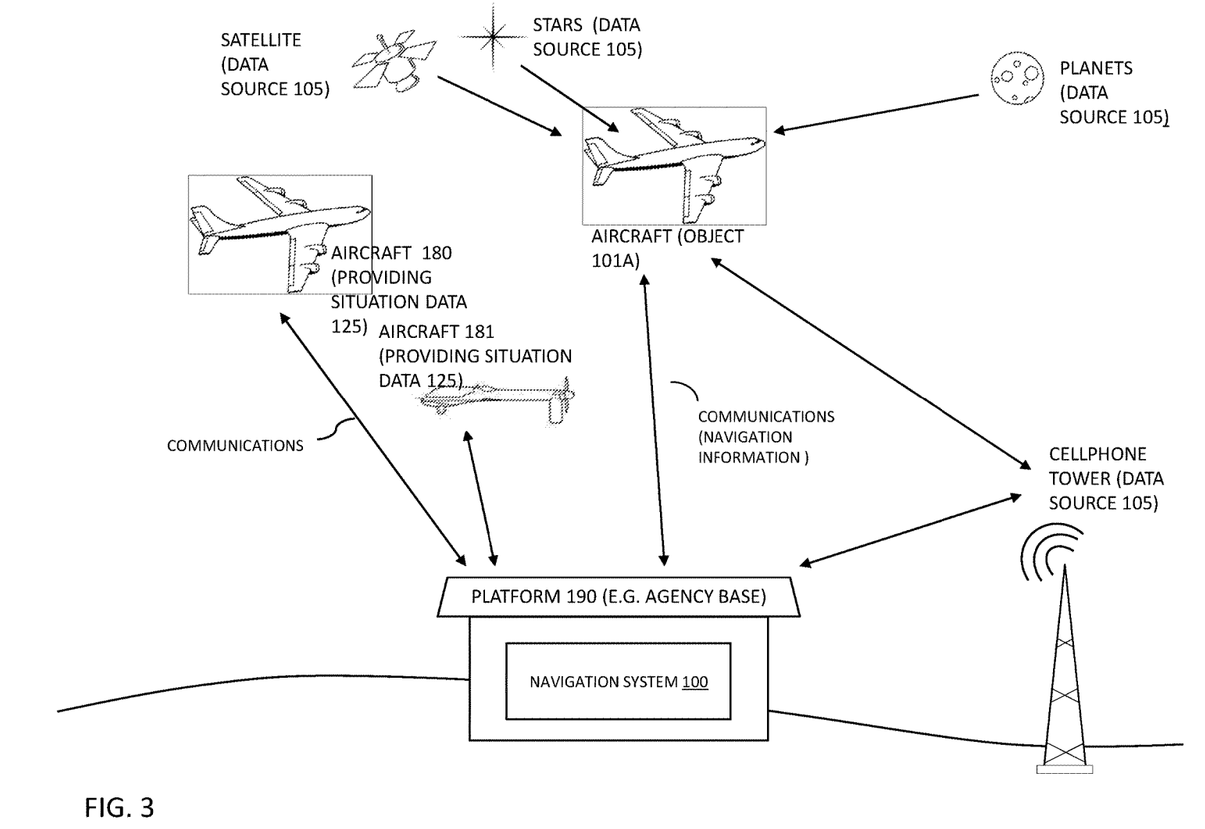
Figure 4:
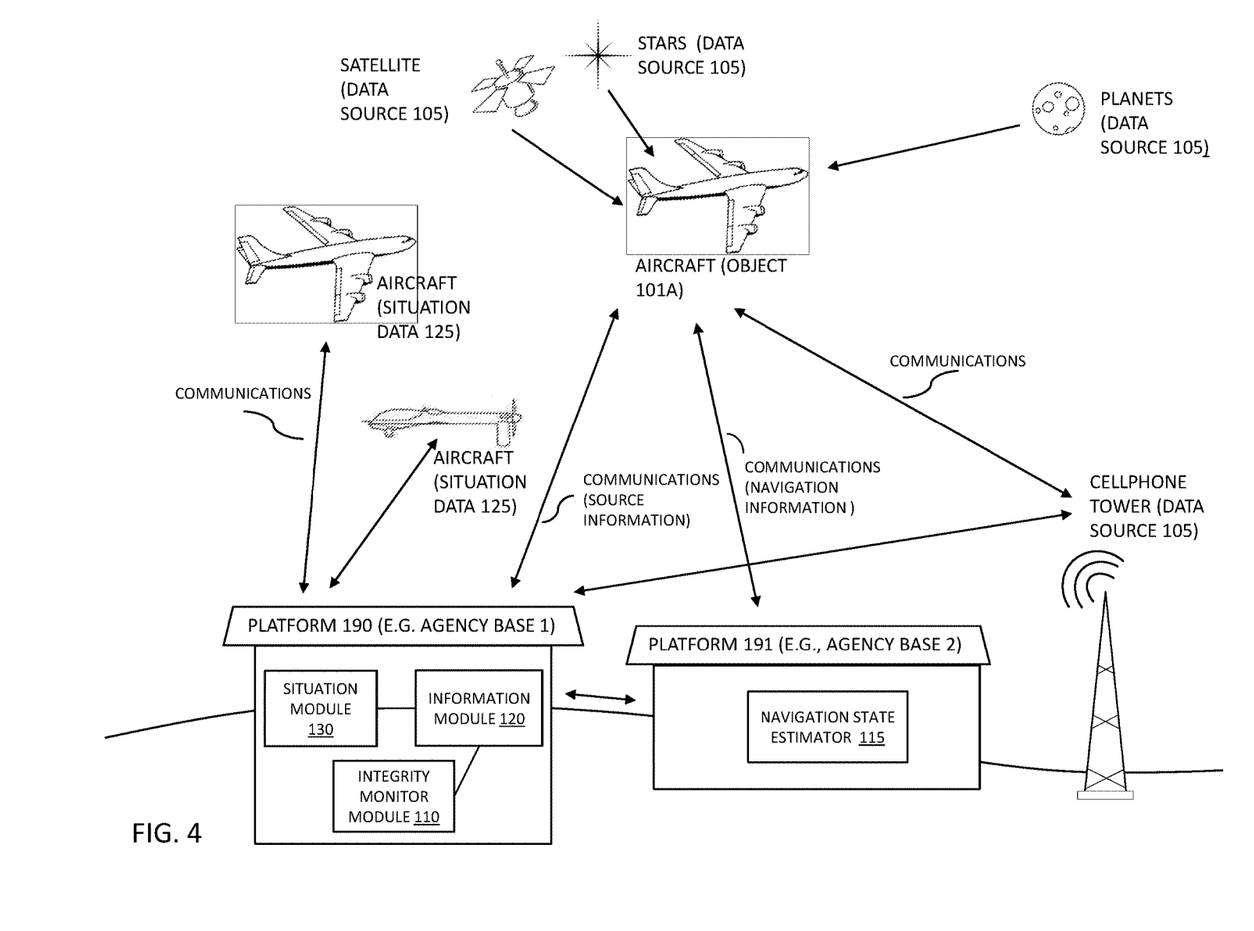

Embodiments of the present invention evaluate source information from one or more data sources and situation data to determine which data sources can be relied on for determining the navigation information of one or more objects. FIG. 1 depicts an exemplary navigation system 100 for determining navigation information for one or more objects using source information validated on the basis of its quality and/or integrity, and FIGS. 2-4 depict exemplary implementations of the navigation system of FIG. 1 and environments in which the implementations may operate.

The navigation system 100 includes multiple data sources 105a, 105b, 105k (collectively, "105") that provide source information that may be used to determine an object's navigation information. Because one or more of the data sources 105 may not be reliable at any given time, the navigation system 100 uses a situation module 130, an information module 130, an integrity monitor module 110, and a navigation state estimator 115, as described in more detail below, to identify the data sources 105 that should be relied on.

In particular, the situation module 130 provides situation data 125 related to the data sources' situation, and the situation module 130 may aggregate the situation data 125 and send it to the information module 120. The information module 120 creates and/or maintains statistical models for estimating the quality and/or integrity of source information from any given data source 105, and uses these models with the situation data (and in some scenarios, source information as well) to determine the estimates of quality and integrity. The information module 120 provides the estimates to the integrity monitor module 110.

The integrity monitor module 110 makes the final determination of the data sources 105 that, at that particular time, should be relied on to determine the navigation information for the object(s) (also referred to herein as "validating" the information from a particular data source). The integrity monitor module 110 may validate any source information based on its integrity and/or quality, and may further determine integrity and/or quality based on information from the data sources 105 (e.g., the source information, quality of the source information, integrity of the source information), information from an information module 120 (e.g., an estimate of the quality and/or an estimate of the integrity of the source information, at a given time), or both.

The integrity monitor module 110 sends the validated source information to the navigation state estimator 115, and in some embodiments, the integrity monitor module 110 refrains from sending source information that has not been, and will not be, validated. The navigation state estimator 115 uses the validated source information to determine the navigation information, which may be transmitted to the one or more objects. In some embodiments, the navigation state estimator 115 may also transmit the navigation information to a display for a user or to other systems, e.g., within the object (not shown). Furthermore, the navigation state estimator 115 may transmit the navigation information back to the integrity monitor module 110, where it may be used to validate subsequent source information received from the data sources 105 and/or information module 120.

As shown in FIGS. 2-4, the various components of the navigation system 100 may be located on one or more platforms in one or more locations. For example, the situation module 130, information module 120, integrity monitor module 110, and/or navigation state estimator 115 may be coupled to the object or may be remotely located from the object, e.g., on a moving platform, or at a stationary site (as shown in FIGS. 3 and 4). In addition, the components may be distributed across multiple platforms, e.g., on moving platforms and/or stationary sites (as shown in FIG. 4).

Data Sources of the Navigation System

As described above, the navigation system 100 for one or more objects may include numerous data sources 105. A data source 105 may be any sensor or source that provides source information used to determine an object's navigation information. For example, the data sources 105 may be vision sensors, laser-based sensors, and GPS sensors. Other examples include chemical sensors, such as directional chemical sensors or particulate sensors. Additional exemplary sensors include gravity-based sensors (e.g., utilizing a gravimeter), RF-based sensors (e.g., utilizing radio frequency (RF) detectors, cellular detectors, WiFi detectors, Bluetooth® detectors), electromagnetic-based sensors in other parts of the spectrum (e.g., microwave detectors, X-ray detectors, electrical field strength detectors, infrared, radar), barometers, magnetic sensors (e.g., utilizing a magnetic field sensor, a magnetometer, an induction coil, a magnetic resonator, magnetic compass), torque and acceleration sensors (e.g., gyroscopes, accelerometers), force sensors (e.g., vibration sensors, pressure sensors, inertial sensors), light sensors (e.g., optical detectors, CMOS sensors, laser system detectors), acoustic sensors (e.g., sonar, ultrasound), celestial navigation sensors (e.g., star trackers), celestial objects, (e.g., stars, planets) and thermal sensors, among others. An electronic support measures (ESM) system and/or a celestial object sighting system (COSS) may also be data sources 105.

In some embodiments, data sources 105 may be located on a platform or distributed across multiple platforms. Alternatively, or in addition, data sources 105 may be deployed in different parts of the environment, such as underground, underwater, terrestrially, in the atmosphere, and/or in space.

Situation Module

As described above, the situation module 130 provides the situation data 125 to the information module 120. The situation module 130 may aggregate situation data 125 before sending it to the information module 120. In some embodiments, the situation module 130 establishes communication links with external systems that provides situation data 125 regarding an object's and/or data sources' environment in real-time. In various embodiments, the situation module 130 is coupled to one or more input devices that respond to user input of situation data 125. Examples of such input devices include graphical user interfaces or manual controls.

For example, the situation module 130 may capture situation data 125 provided by external sources (e.g., communication links) regarding the integrity of particular data sources 105 (e.g., a particular sensor is known to be not operating as indicated by its quality measure or is compromised with the same result). The situation module 130 may also capture other relevant situation data 125 provided by other systems, e.g., systems on the same platform that include the navigation system 100 or a different platform, such as information that may be provided by an Electronic Support Measures (ESM) system. For example, an ESM system may identify electromagnetic signals that may interfere with data sources 105, and this situation data 125 should thus be considered by the information module 120 when determining data source(s) 105 integrity and/or quality.

Various types of situation data may include environment conditions (e.g., reports about inclement weather in a territory that the object or data source is expected to pass through), position information, temporal information, platform configuration, mission phase, data source location, system health, mission plan, threat data (e.g., an alert from a vehicle or an agency that a newly launched enemy mission has been detected within the object's or data sources' vicinity), condition of a threat, threat operating capabilities, threat location, temperature, cloud cover, visibility, barometric pressure, terrain, time of year, tides, radiation environment, population, city information, street information, building information, known transmitters, known vehicles, visible stars, and/or location of satellites in the sky, as well as any situation data that would be beneficial to the navigation system, as known by one of ordinary skill in the art.

Situation data may also include any of the navigation information described herein, e.g., velocity and attitude.

In some embodiments, situation data 125 may be stored in one or more databases. The database(s) may include previously received situation data (e.g., apriori) and/or real-time situation data (e.g., dynamic). The databases may include data stored at the beginning of the object's travel. The databases may store situation data for the object and/or data source(s) for a predetermined period of time, e.g., the past three hours. As the databases receive additional situation data, the databases may overwrite some of the previously stored data or aggregate the data. In some embodiments, the databases may store different types of situation data for different lengths of time (e.g., tides for the past two hours, weather-related data for the past hour, etc.).

The Information Module

The information module 120 describes the integrity and the quality of the source information from the data source(s) 105 based on a dynamic, statistical representation of the situation data 125 in combination with the quality and integrity information supplied by the data source(s) 105 for the current time. The situation data 125 received from the situation module 130 may be based on apriori situation data, updates provided by communication links, and the source information provided by each of the data sources 105. The information module 120 creates or provides statistical models to determine an estimate of quality and/or an estimate of integrity, which the information module 120 provides to the integrity monitor module 110. The information module 120 maintains the models (e.g., profiles, statistics) of all data that may influence the navigation state estimator 115, e.g., given the navigation state is $X_n$, the likelihood data source 105 i is compromised and should be discarded is a. For example, the information module 120 maintains statistics on data source 105 integrity and/or quality that are dependent on navigation state (e.g., position, altitude, velocity, time) and also on other factors, such as platform configuration (e.g., components included in the system), threat data (e.g., physical threats and obstacles, jamming sources), mission plan (e.g., typical factors encountered during a mission, changes to the plan), environment of deployment (e.g., weather, surrounding terrain, surrounding other navigation facilities, surrounding mobile facilities), types of sensor/internal navigation facility (e.g., common to other multi-sensor navigation facilities, expected performance under conditions), and/or profiles of external navigation sources (e.g., RF navigation signals and sources, visual field data, data channels of navigation data).

The information module 120 uses the models and situation data 125 received from the situation module 130 to determine the estimates of quality and integrity. Because the situation data 125 may change dynamically (as explained below), the information module 120 may update the resulting models accordingly. In this manner, the situation data 125 is used in the integrity monitor module's 110 initial assessment of the reliability of various data sources 105 and also used in subsequent assessments of the data sources 105 over time.

In some embodiments, the information module 120 may also receive source information from one or more of the data sources 105 and use this source information in its models to determine the estimates of integrity and quality. In one embodiment, the information module 120 may determine an estimate of integrity of the source information from one data source 105 by comparing it against source information from one or more other data sources 105.

For example, the information module 120 may receive source information from one or more data sources 105 regarding the tides in the geographical area(s) that the object has been traveling over, e.g., for the past three hours. The model may be dynamically updated with source information and situation data 125 to reflect any changes in the tide environment over time. For example, if source information from a first data source 105 indicates a low tide for the past three hours and abruptly indicates that the tide is now high, the model may be updated with the source information from the first data source 105 and, based on source information from other data sources 105 and/or situation data 125 received from the situation module 130, the information module 120 may provide an updated estimate of the integrity of the first data source. Similarly, the information module 120 may receive source information from one or more data sources 105 related to stars, and the model may be updated to reflect any changes over time. For example, if source information from one data source 105 indicates that a star is located at a position that deviates widely from past source information from this data source 105 or other data sources 105 regarding the same star, the information module 120 may be updated with the source information from the data source(s) 105 and the information module 120 may use this source information in its model(s) to provide an updated estimate of the integrity of the data source(s) 105.

In another example, the information module 120 may use situation data 125 received from the situation module 130 regarding a newly launched enemy mission known to be within the object's vicinity. The information module 120 may use this situation data 125 to estimate the quality and/or integrity of the source information from the data sources 105 in the vicinity of the object that may be disrupted or spoofed.

In another example, the information module 120 may receive situation data 125 from the situation module 130 regarding a time of day and use this situation data 125 along with source information from data source(s) 105 to provide estimates of the quality and/or integrity using its statistical models. For instance, celestial objects that orbit the earth are known to provide unreliable source information at certain times of the day (e.g., around midnight). Consequently, the information module 120 may use the time of day situation data 125 to estimate the quality and/or integrity of the source information from these celestial objects over time so that this source information is not used in the navigation system 100 to determine the navigation information when the source information is unreliable, e.g., around midnight.

The information module 120 includes one or more models that describe a dynamic and probabilistic state of the source information in order to determine the estimates of quality and/or integrity of the source information for each data source 105. When the situation in which the source information is obtained is fully known, then the information module 120 may use a dynamic and probabilistic state of the source information. When the situation in which the source information is obtained is uncertain, then the information module 120 may use a probabilistic state representing the uncertainty associated with the source information.

For example, the situation data 125 may include low visibility due to fog within the immediate environment of the data source(s) 105. Although the data sources 105, e.g., image sensors, might be functioning properly (i.e., they have good perceived quality), the low visibility might render the source information, e.g., the image data, unreliable. Consequently, the information module 120 may use model(s) based on a probabilistic state in order to determine an estimate of integrity of the data sources 105. When the fog lifts and visibility becomes clear, the information module 120 may use model(s) based on a dynamic and probabilistic state to determine the estimate of integrity of the source information.

In another example, the situation data 125 may include data indicating that enemy vehicles in the vicinity of one or more data sources 105 are equipped with radar jamming devices. The proximity and capabilities of the enemy vehicles indicate an uncertain situation with respect to any data sources 105 that rely on radar in that area. In this situation, the information module 120 may use model(s) based on a probabilistic state in order to determine an estimate of integrity of the data sources 105.

The Integrity Monitor Module

The integrity monitor module 110 receives the source information generated by each of the data sources 105 and receives the estimates of quality and/or integrity from the information module 120 to determine whether to validate and supply the source information to the navigation state estimator 115 and, if so, what quality that source information should have. As mentioned above, the integrity monitor module 110 may determine integrity and/or quality based on information from the data sources 105, information from the information module 120, or both. The integrity monitor module 110 sends the validated source information to the navigation state estimator 115, and in some embodiments, the integrity monitor module 110 may refrain from sending source information that has not been validated.

In some embodiments, the integrity monitor module 110 uses navigation information previously generated by the navigation state estimator 115 to determine the integrity and/or quality of the source information. The integrity monitor module 110 may use multiple techniques to determine the integrity of source information. For example, the integrity monitor module 110 may compare $z_i$ to a value of the source information determined by the navigation state estimator 115, for instance, in the case of an extended Kalman filter, $h(\hat{X}_{k|k-1})$, and compare the resultant residual (e.g., the difference between $z_i$ and the value determined by the navigation state estimator 115) to that which would be acceptable given the expected quality of that source information. For example, the resultant residual may be compared to a threshold value and deemed acceptable if it is below the threshold value. In various embodiments, the threshold value may be predetermined, provided dynamically by a sensor, or provided by the information model 120.

As mentioned above, the data source 105 that provides the source information may also provide the quality of that source information, or the information model 120 may provide expected quality of the source information, or both the data source 105 and information model 120 may provide expected quality. The integrity monitor module 110 may determine the integrity and/or quality of the source information from the data source 105 based on a comparison between the source information and its expected value and may ignore the source information when the difference is greater than a quality threshold value or an integrity threshold value and may validate the source information when the quality and/or integrity of the source information falls within a predetermined acceptable range. For example, when the information model 120 and the data source 105 both provide expected quality of the source information and the values substantially differ (e.g., by a percentage, by a numerical factor, based on a threshold), the integrity monitor module 110 may use that difference as a reason to ignore the source information and not validate it, or the integrity monitor module 110 may override the source information quality provided by the data source 105 and replace it with the information model 120 source information quality and then validate and pass the source information to the navigation state estimator 115 with the quality estimate the integrity monitor module 110 provides.

When the integrity monitor module 110 validates source information, the integrity monitor module 110 passes the source information to the navigation state estimator 115 and also passes the quality of the validated source information. As described above, the integrity monitor module 110 receives the source information from one or more data sources 105 and determines the quality and/or integrity of the data sources 105 using the estimate of quality and/or integrity from the information module 120 along with the quality and/or integrity of source information from the data sources 105. The source information from the data sources 105 may be processed, using standard data processing techniques as known by one skilled in the art, before the source information is used by the integrity monitor module 110 and/or the information module 120 and passed to the navigation state estimator 115. Therefore, the source information used in the navigation system 100 disclosed herein may include processed or unprocessed source information.

The Navigation State Estimator

The navigation state estimator 115 uses the validated source information from the integrity monitor module 110 to determine the navigation information for one or more objects in real time. The navigation state estimator 115 provides an estimate of the navigation information at any given time, regardless of how often the navigation state estimator 115 receives the validated source information from the integrity monitor module 110. The navigation state estimator 115 may function using discrete-time Markov processes with a probability density function $f(x|\hat{x})$ that denotes the probability of moving from state $\hat{x}$ to state x. For example, given some state $\{X_n\}_{n\geq 1}$, the source information $\{Z_n\}_{n\geq 1}$ have marginal densities that are given by $z_n|(X_n=x_n) \sim g(z_n|X_N)$. The implementation of the navigation state estimator 115 may be accomplished by estimation algorithms such as an extended Kalman filter, a particle filter, a nonlinear moment filter, a Hidden Markov Model, and/or a Bayesian filter.

Whenever source information, $z_i'$, is available from the integrity monitor module 110, the navigation state estimator 115 updates the navigation information or state estimate $\hat{X}_n$ based on whatever additional or new information may be available in the source information to form the best possible state estimate at that point in time. The navigation state estimator 115 then propagates the navigation information or state estimate forward in time as needed by the navigation system 100 and in time increments called navigation epochs that may or may not be regular time intervals. The navigation epoch does not need to be constant and does not need to be synchronized with inputs of the validated source information from the integrity monitor module 110 to the navigation state estimator 115. For example, the navigation state estimator 115 may determine the navigation information every second, every few seconds, every minute, or every few minutes, even though the integrity monitor module 110 may be providing validated source information to the navigation state estimator 115 in time intervals longer or shorter than the navigation epochs.

As mentioned above, the navigation state estimator 115 may also transmit the navigation information back to the integrity monitor module 110, where it may be used to validate subsequent source information received from the data sources 105 and/or information module 120. For example, the navigation state estimator 115 receives accelerations and angular rates from data sources 105, such as accelerometers and gyroscopes. This source information may be measured over a period of time, and the result used to determine the navigation information for an object. However, misalignment and bias errors are inherent in the accelerations and angular rates, and both compound over time. When the navigation state estimator 115 receives a validated and updated geolocation from a GPS system, the source information from the GPS system may be used to bound or otherwise correct for these errors.

As mentioned above, FIG. 2 depicts an exemplary environment in which the navigation system 100 may operate. In this example, object 101a is an aircraft whose navigation information is determined by the navigation system 100. The navigation system 100 includes numerous data sources 105, such as a GPS satellite, COSS system, stars, planets, and cell phone tower. The data sources 105 send source information to the navigation system 100.

In one embodiment, the navigation system 100 may be configured to communicate with other aircraft 180, unmanned vehicles 181, personal devices 182 of people, vehicles 183, and vice versa. Any of these entities 180-183 may evaluate the environment of the data sources 105 to obtain situation data 125. Then, the entities may transmit the situation data 125 to the situation module 130 of the navigation system 100, which, in this embodiment, is located on the aircraft 101a. The navigation system 100 may use its situation module 130, information module 120, and integrity module 110 to determine which data sources 105 to rely on and use in its navigation state estimator 115, as described above.

FIG. 3 depicts another exemplary environment in which the navigation system 100 may operate. In this example, the navigation system 100 is located entirely on a stationary platform 190, such as a base for a government agency. Thus, the stationary platform 190 houses the integrity monitor module 110, the information module 120, the situation module 130, and the navigation state estimator 115. The aircraft 101a receives source information from data sources 105 such as satellites 105, stars 105, planets 105, and cellphone towers 105 and transmits the source information to the navigation system 100. Furthermore, entities such as the aircrafts 180, 181 may evaluate the existing environment of the data sources 105 to obtain situation data 125, which is provided to the situation module 130 located on the stationary platform 190. The navigation system 100 uses the received situation data 125 and source information from the data sources 105 to determine which data sources 105 to rely on and use in its navigation state estimator 115, as described above.

FIG. 4 depicts a further exemplary environment in which the navigation system 100 may operate. In this example, modules of the navigation system 100 are distributed across multiple platforms 190, 191, such as different bases for a government agency. One platform 190 may house the integrity monitor module 110, the information module 120, and the situation module 130, while the other platform 191 may house the navigation state estimator 115. The aircraft 101a may receive source information from data sources 105 such as satellites 105, stars 105, planets 105, and cellphone towers 105 and transmit this information to the integrity monitor module 110 of one platform 190. The entities 180, 181 that are evaluating the environment of the data sources 105 will provide their situation data 125 to the situation module 130, also located on that platform 190. The integrity monitor module 110 provides validated source information and corresponding quality of the source information to the navigation state estimator 115 on the other platform 191, which uses this information to determine the navigation information of the aircraft 101a.

Other Features

In various embodiments, one or more components of the navigation system 100 may include one or more processors, memory, an operating system, and one or more programs or applications executing on them to perform the steps described herein (also referred to herein as a "computing platform"). The computing platform may be a stand-alone navigation device (e.g., a hand-held navigation device, a body-mounted navigation device, a smart phone, a tablet, or the like), a navigation device embedded in a user vehicle (e.g., an automobile, a ship, an airplane, a train, a special-purpose vehicle, or the like), or a navigation device embedded in a partially or fully autonomous vehicle (e.g., drone, driverless automobile, robotic device, underwater robotic device, missile, satellite), by way of example.

The embodiments of the invention described above are intended to be merely exemplary; numerous variations and modifications will be apparent to those skilled in the art. All such variations and modifications are intended to be within the scope of the present invention as defined by the appended claims.

What is claimed is:

1. A navigation system for determining quality and integrity of source information to determine navigation information of one or more objects, the system comprising:
   one or more data sources, each data source configured to provide the source information;
   a situation module configured to provide situation data;
   an information module configured to determine an estimate of the quality and an estimate of the integrity of the source information, at a given time, based on the source information received from the one or more data sources and based on the situation data received from the situation module;
   an integrity monitor module
      configured to receive the estimate of the quality and the estimate of the integrity of the source information from the information module and to receive the source information from the one or more data sources,
      configured to determine the integrity and the quality of the source information based on the estimate of the quality and the estimate of the integrity of the source information from the information module, and
      configured to validate the source information based on (1) the integrity of the source information, (2) the quality of the source information, or (3) both the integrity and the quality of the source information; and
   a navigation state estimator configured to determine the navigation information of the one or more objects based on the source information that was validated and corresponding quality of the source information received from the integrity monitor module.

2. The navigation system of claim 1, wherein
the one or more data sources are further configured to provide (1) the quality of the source information, (2) the integrity of the source information, or (3) both the quality and the integrity of the source information;
the information module is further configured to receive (1) the quality of the source information from the one or more data sources, (2) the integrity of the source information from the one or more data sources, or (3) both the quality and the integrity of the source information from the one or more data sources and configured to determine the estimate of the quality and the estimate of the integrity of the source information further based on (1) the quality of the source information from the one or more data sources, (2) the integrity of the source information from the one or more data sources, or (3) both the quality and the integrity of the source information from the one or more data sources; and
the integrity monitor module is further configured to receive (1) the quality of the source information from the one or more data sources, (2) the integrity of the source information from the one or more data sources, or (3) both the quality and the integrity of the source information from the one or more data sources and configured to determine the integrity and the quality of the source information further based on (1) the quality of the source information from the one or more data sources, (2) the integrity of the source information from the one or more data sources, or (3) both the quality and the integrity of the source information from the one or more data sources.

3. The navigation system of claim 2, wherein the integrity monitor module is further configured to determine whether (1) to use the source information from the one or more data sources or (2) to process at least a portion of the source information and to use the processed source information, based on the estimate of the quality and the estimate of the integrity of the source information from the information module and (1) the quality of the source information from the one or more data sources, (2) the integrity of the source information from the one or more data sources, or (3) both the quality and the integrity of the source information from the one or more data sources.

4. The navigation system of claim 2, wherein
the navigation state estimator is further configured to provide the navigation information of the one or more objects to the integrity monitor module, and
the integrity monitor module is configured to determine the integrity and the quality of the source information further based on the navigation information.

5. The navigation system of claim 2, wherein the integrity monitor module is further configured to compare (1) the integrity of the source information from the one or more data sources, (2) the quality of the source information from the one or more data sources, or (3) both the integrity and the quality of the source information from the one or more data sources, to (1) the estimate of the integrity from the information module, (2) the estimate of the quality from the information module, or (3) both the estimate of the integrity and the estimate of the quality from the information module, in order to determine the integrity and the quality of the source information.

6. The navigation system of claim 5, wherein the integrity monitor module is configured to ignore the source information from the one or more data sources when a difference between a value of the source information and an expected value of the source information differs by more than a threshold value.

7. The navigation system of claim 2, wherein the information module is further configured to replace (1) the integrity of the source information from the one or more data sources, (2) the quality of the source information from the one or more data sources, or (3) both the integrity and the quality of the source information from the one or more data sources, when determining the estimate of the quality and the estimate of the integrity of the source information.

8. The navigation system of claim 1, wherein the integrity monitor module is further configured to validate the source information when the quality of the source information falls within a predetermined acceptable range.

9. The navigation system of claim 1, wherein the integrity monitor module is further configured to determine whether (1) to use the source information from the one or more data sources or (2) to process at least a portion of the source information and to use the processed source information, based on the estimate of the quality and the estimate of the integrity of the source information from the information module.

10. The navigation system of claim 1, wherein
the navigation state estimator is further configured to provide the navigation information of the one or more objects to the integrity monitor module, and
the integrity monitor module is configured to determine the integrity and the quality of the source information further based on the navigation information.

11. The navigation system of claim 1, wherein the information module is further configured to maintain a dynamic state and a probabilistic state of the source information based on the situation data, wherein the information module is configured to determine the estimate of the quality and the estimate of the integrity further based on the dynamic state and the probabilistic state of the source information when the situation data establishes that the source information was obtained in a known situation, and the information module is configured to determine the estimate of the quality and the estimate of the integrity further based on the probabilistic state of the source information when the situation data establishes that the source information was obtained in an uncertain situation.

12. The navigation system of claim 1, wherein the navigation information includes geolocation, velocity, altitude, errors in position, errors in velocity, errors in attitude, time, clock errors, propagation delays, GPS satellite errors, sensor errors, sensor characterization parameters or any combination thereof.

13. The navigation system of claim 1, wherein the navigation state estimator includes an extended Kalman filter, a particle filter, a nonlinear moment filter, a Hidden Markov Model, a Bayesian filter or any combination thereof.

14. The navigation system of claim 1, wherein the situation module receives the situation data from databases with stored situation data previously known, from communication links with updated situation data that changes over time, from the one or more data sources, from detection systems that provide the situation data based on detected conditions, or any combination thereof.

15. The navigation system of claim 1, wherein the situation data includes environment conditions, position information, velocity, attitude, temporal information, platform configuration, mission phase, data source location, system health, mission plan, threat data, condition of a threat, threat operating capabilities, threat location, temperature, cloud cover, visibility, barometric pressure, terrain, time of year, tides, radiation environment, population, city information, street information, building information, known transmitters, known vehicles, visible stars, location of satellites in the sky, or any combination thereof.

16. A method for determining quality and integrity of source information to determine navigation information of one or more objects, the method comprising:
providing the source information from one or more data sources;
providing situation data from a situation module;
determining an estimate of the quality and an estimate of the integrity of the source information, at a given time, based on the situation data and the source information;
determining the integrity and the quality of the source information based on the estimate of the quality and the estimate of the integrity of the source information;
validating the source information based on (1) the integrity of the source information, (2) the quality of the source information, or (3) both the integrity and the quality of the source information;
determining the navigation information of the one or more objects based on the source information that was validated and corresponding quality of the source information; and
controlling at least one object to navigate to a desired destination based on the determined navigation information.

17. The method of claim 16, further comprising:
providing (1) the quality of the source information, (2) the integrity of the source information, or (3) both the quality and the integrity of the source information from the one or more data sources,
wherein determining the estimate of the quality and the estimate of the integrity of the source information is further based on (1) the quality of the source information from the one or more data sources, (2) the integrity of the source information from the one or more data sources, or (3) both the quality and the integrity of the source information from the one or more data sources, and
wherein determining the integrity and the quality of the source information is further based on (1) the quality of the source information from the one or more data sources, (2) the integrity of the source information from the one or more data sources, or (3) both the quality and the integrity of the source information from the one or more data sources.

18. The method of claim 17, further comprising:
determining whether (1) to use the source information from the one or more data sources or (2) to process at least a portion of the source information and to use the processed source information, based on the estimate of the quality and the estimate of the integrity of the source information and (1) the quality of the source information from the one or more data sources, (2) the integrity of the source information from the one or more data sources, or (3) both the quality and the integrity of the source information from the one or more data sources.

19. The method of claim 17, further comprising:
providing the navigation information of the one or more objects, wherein determining the integrity and the quality of the source information is further based on the navigation information.

20. The method of claim 17, further comprising:
comparing (1) the integrity of the source information from the one or more data sources, (2) the quality of the source information from the one or more data sources, or (3) both the integrity and the quality of the source information from the one or more data sources, to (1) the estimate of the integrity, (2) the estimate of the quality, or (3) both the estimate of the integrity and the estimate of the quality, to determine the integrity and the quality of the source information.

21. The method of claim 20, further comprising:
ignoring the source information from the one or more data sources when a difference between a value of the source information from one or more data sources and an expected value of the source information differs by more than a threshold value.

22. The method of claim 17, further comprising:
replacing (1) the integrity of the source information from the one or more data sources, (2) the quality of the source information from the one or more data sources, or (3) both the integrity and the quality of the source information from the one or more data sources, when determining the estimate of the quality and the estimate of integrity of the source information.

23. The method of claim 16, wherein validating the source information includes validating when the quality of the source information falls within a predetermined acceptable range.

24. The method of claim 16, further comprising:
determining whether (1) to use the source information from the one or more data sources or (2) to process at least a portion of the source information and to use the processed source information, based on the estimate of the quality and the estimate of the integrity of the source information.

25. The method of claim 16, further comprising:
providing the navigation information of the one or more objects, wherein determining the integrity and the quality of the source information is further based on the navigation information.

26. The method of claim 16, further comprising:
maintaining a dynamic state and a probabilistic state of the source information based on the situation data, wherein determining the estimate of the quality and the estimate of the integrity of the source information is further based on the dynamic state and the probabilistic state of the source information when the situation data establishes that the source information was obtained in a known situation, and is further based on the probabilistic state of the source information when the situation data establishes that the source information was obtained in an uncertain situation.

27. The method of claim 16, wherein determining the navigation information of the one or more objects includes applying an extended Kalman filter, a particle filter, a nonlinear moment filter, a Hidden Markov Model, a Bayesian filter, or any combination thereof to the source information that was validated and the corresponding quality of the source information.

28. The method of claim 16, wherein the situation module receives the situation data from databases with stored situation data previously known, from communication links with updated situation data that changes over time, from the one or more data sources, from detection systems that provide the situation data based on detected conditions, or any combination thereof.

* * * * *